(12) United States Patent
Basch et al.

(10) Patent No.: US 7,389,019 B1
(45) Date of Patent: Jun. 17, 2008

(54) VARIABLE PHOTONIC COUPLER

(75) Inventors: E. Evert Basch, Stow, MA (US); Steven Anthony Gringeri, Foxboro, MA (US)

(73) Assignee: Verizon Services Organization Inc., Waltham, MA (US)

( * ) Notice: Subject to any disclaimer, the term of this patent is extended or adjusted under 35 U.S.C. 154(b) by 0 days.

(21) Appl. No.: 11/612,646

(22) Filed: Dec. 19, 2006

(51) Int. Cl.
*G02B 6/26* (2006.01)
*G02B 6/12* (2006.01)

(52) U.S. Cl. .................. 385/30; 385/40; 385/14

(58) Field of Classification Search ............ 385/30, 385/40, 14
See application file for complete search history.

(56) References Cited

U.S. PATENT DOCUMENTS

| | | | | |
|---|---|---|---|---|
| 5,970,186 | A * | 10/1999 | Kenney et al. | 385/16 |
| 6,175,671 | B1 * | 1/2001 | Roberts | 385/14 |
| 6,661,950 | B1 * | 12/2003 | Strecker | 385/30 |
| 6,834,149 | B1 * | 12/2004 | Dietz et al. | 385/122 |
| 7,003,181 | B2 * | 2/2006 | Domash et al. | 385/10 |
| 2003/0081881 | A1 * | 5/2003 | Alegria | 385/15 |
| 2004/0184711 | A1 * | 9/2004 | Bradley et al. | 385/16 |
| 2005/0189591 | A1 * | 9/2005 | Gothoskar et al. | 257/347 |
| 2005/0254752 | A1 * | 11/2005 | Domash et al. | 385/37 |
| 2006/0193557 | A1 * | 8/2006 | Bradley et al. | 385/32 |
| 2006/0227331 | A1 * | 10/2006 | Vollmer et al. | 356/483 |

* cited by examiner

*Primary Examiner*—Kianni C Kaveh

(57) ABSTRACT

A system is provided including a first waveguide having an optical input and a first optical output. A second waveguide includes a second optical output. A coupling region is between the first waveguide and the second waveguide. The coupling region controllably couples the first waveguide and the second waveguide when a field is applied to the coupling region. The strength of the field is variable to control the coupling. Further, the first waveguide, the second waveguide, and the coupling region may be made of electro-optical material. In another example, a component is provided including a substrate and an electro-optical material formed on the substrate. A first and second waveguide are formed of said electro-optical material. An electrode structure is formed proximal to the first waveguide and the second waveguide. The electrode structure selectively provides an electric field in the electro-optical material when a voltage is applied to the electrode structure.

16 Claims, 3 Drawing Sheets

VARIABLE PHOTONIC COUPLER

BACKGROUND INFORMATION

Current photonic systems (e.g., fiber optic communication systems) use a redundant dual fabric design to achieve high reliability where signals are routed to both a primary and a backup fabric. This is achieved using a fifty-fifty (50/50) splitter to route the input light to both fabrics. A selector is then used at the output to switch light from the primary or backup fabric to the output. However, these systems do not support in-service monitoring, bridge, or merge protection. Additionally, a second light source is required to focus and test the secondary fabric. For reliability, the switch being a necessary component of the system, lowers overall reliability since it is an active component and its functionality cannot be tested without interrupting the signal transmission path.

Accordingly, it would be advantageous to provide a component and system having the same capability as a fixed splitter with the advantages of a switch. When used as a splitter, it would be advantageous to split a portion of optical power for monitoring and/or diagnostic functions. When used as a switch, it would be advantageous to transfer all of the optical power to a secondary fabric,

DETAILED DESCRIPTION

A variable photonic coupler is disclosed for distributing optical power between two outputs. The variable photonic coupler uses an electric field to modify the refractive index of two waveguides resulting in evanescent coupling between them. In one exemplary approach the variable photonic coupler may be used as a switch to couple all of the optical input power to one of two outputs. In another exemplary approach the variable photonic coupler is used to direct a portion of the optical input to one of the two optical outputs. When used as a switch, the variable photonic coupler may be used to switch an optical signal in an optical fabric system. When used as a variable coupler, power may be provided to monitoring devices for diagnosis and testing. Moreover, if a problem is detected, an increased portion of power may be directed to the monitoring devices in-service while still maintaining the main transmission path with usable optical power.

Figure 1A:
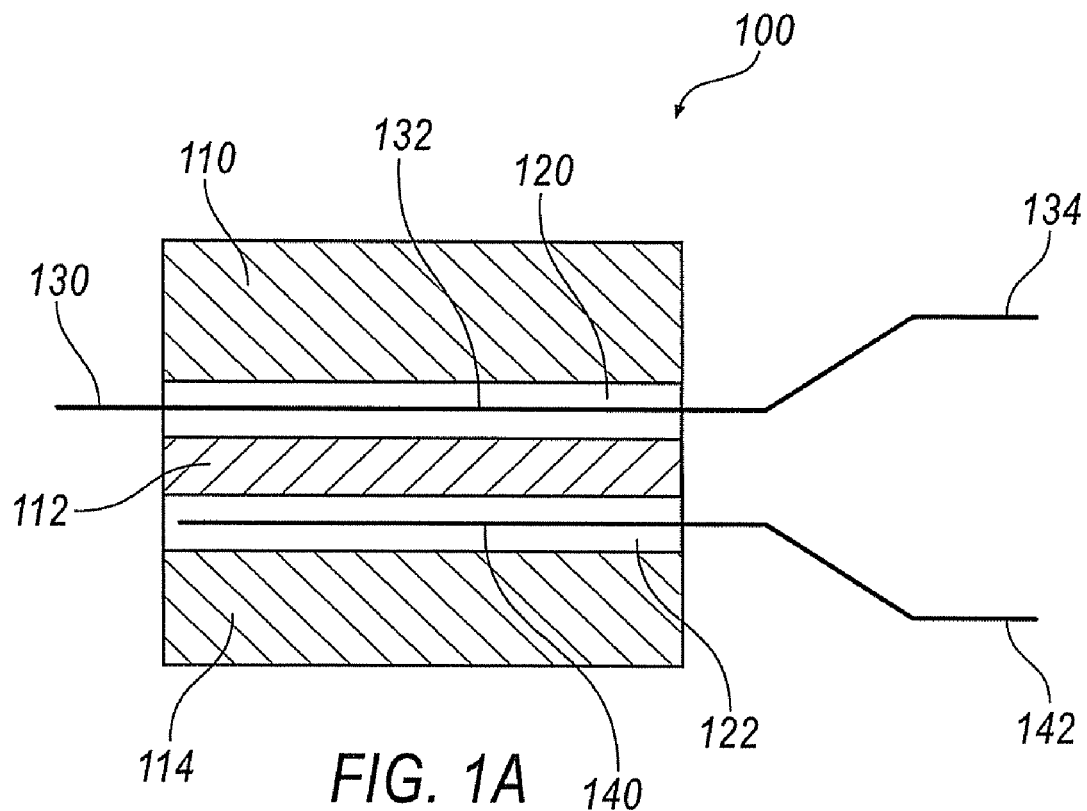
FIG. 1A is a top cross-sectional view of a variable photonic coupler.

FIG. 1A is a top cross-sectional view of an exemplary variable photonic coupler 100. A first region 110 and a coupling region 112 are adjacent to a first waveguide 120. A second waveguide 122 is separated from first waveguide 120 by coupling region 112. Second waveguide 122 is further adjacent to a second region 114. Shown here as an overview, a detailed description of the elements and materials of variable photonic coupler 100 are shown in cross-section with respect to FIGS. 2A and 2B.

An optical input path 130 provides an optical signal to variable phonic coupler 100. The input signal travels along a first coupling path 132 and may couple with a second coupling path 140 before exiting a first output 134 and/or a second output 142. Depending upon the amount of coupling of first coupling path 132 with second coupling path 140, the input signal provided by optical input path 130 may be partially or substantially entirely coupled to second output 142.

In an example where complete coupling is provided between first coupling path 132 and second coupling path 140, substantially the entire signal provided at optical input path 130 is switched to second output 142. In an example where no coupling is provided between first coupling path 132 and second coupling path 140, substantially the entire signal provided at optical input path 130 is sent to first output 134. As is explained below in detail with respect to FIG. 2C, a continuous and variable switching function is provided between first coupling path 132 and second coupling path 140 allowing for partial switching of the signal provided at optical input path 130 to be selectively switched in whole or in part to second output 142.

Figure 1B:
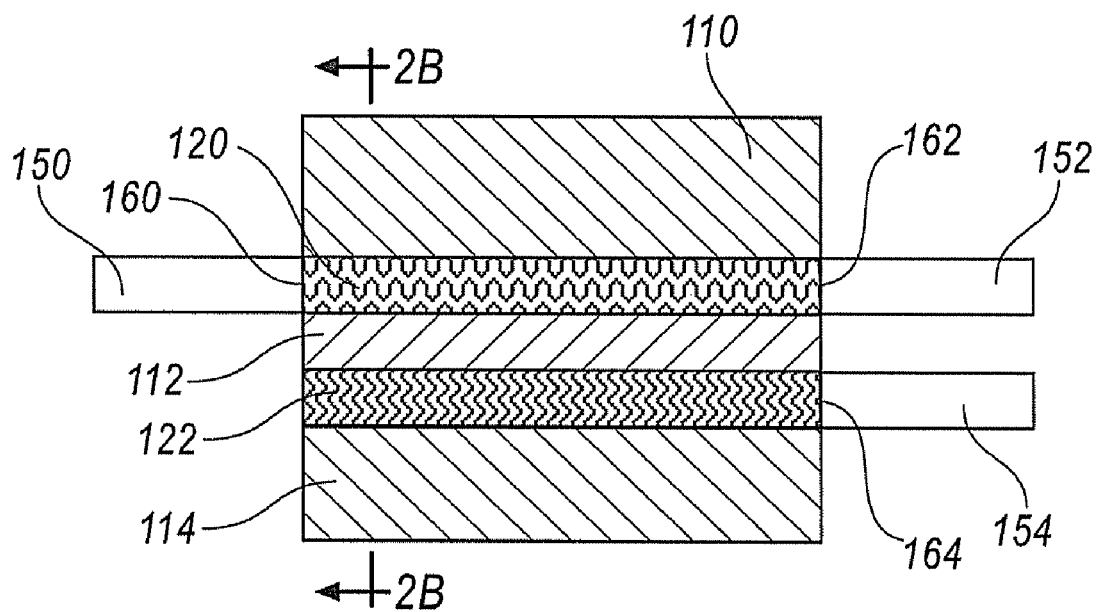
FIG. 1B is a top cross-sectional view of the variable photonic coupler of FIG. 1A having optical fibers attached.

FIG. 1B is a top cross-sectional view of the variable photonic coupler of FIG. 1A having optical fibers attached. An input fiber 150 and a first output fiber 152 are aligned with first waveguide 120. A second output fiber 154 is aligned with second waveguide 122. Fibers 150, 152, 154 are "butt-coupled" (i.e., butt fiber-to-chip coupled) to waveguides 120, 122 as is known in the art for optically coupling an optical fiber to a semiconductor device. Such coupling is performed by substantially contacting a fiber directly against the semiconductor device. However, other coupling methods may be used.

In general, input fiber 150 is coupled to an optical input 160 of first waveguide 120. First output fiber 152 is coupled to a first optical output 162 of first waveguide 120. A second optical output 164 is coupled to a second waveguide 122 of second waveguide 122. Input fiber 150 carries an optical signal (e.g., a signal along optical input path 130 of FIG. 1A) to first waveguide 120. Output fibers 152, 154 carry an optical signal (e.g., first output 134 and second output 142 of FIG. 1A) away from first waveguide 120 and second waveguide 122, respectively.

Figure 2A:
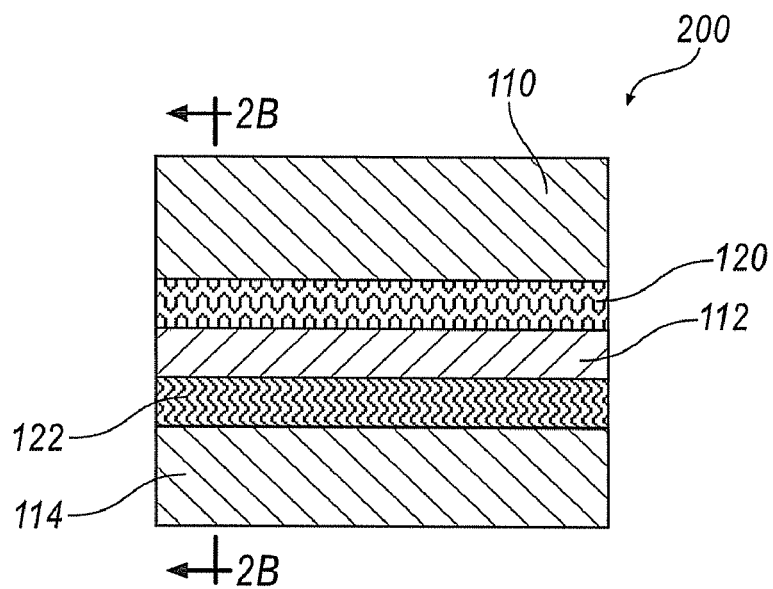
FIG. 2A is a top cross-sectional view of the variable photonic coupler of FIG. 1A taken along section line 2A as shown in FIG. 2B.
Figure 2B:
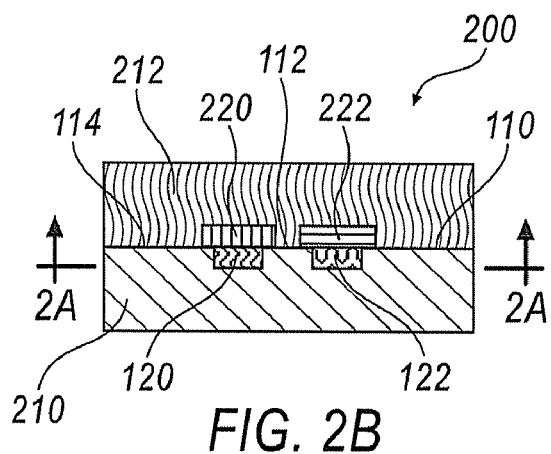
FIG. 2B is a front cross-sectional view of the variable photonic coupler of FIG. 1A taken along section line 2B as shown in FIG. 2A.

FIG. 2A is a top cross-sectional view of a variable photonic coupler 200 taken along section line 2A as shown in FIG. 2B. First region 110 and second region 114 are regions adjacent to first waveguide 120 and second waveguide 122. First waveguide 120, second waveguide 122, and coupling region 112 are preferably formed in an electro-optical material such as Lithium Niobate (LiNbO$_3$). Other electro-optical materials comprise, but are not limited to, Gallium Arsenide (GaAs), Indium Phosphate (InP), BaTiO$_3$ (BT), Strontium Barium Niobate (SBN), and Lithium Tantalate (LiTaO$_3$). In general, the refractive index of electro-optical materials may be modified when an electric field is applied.

FIG. 2B is a front cross-sectional view of variable photonic coupler 200 taken along section line 2B shown in FIG. 2A. A substrate 210, is provided as a substrate for constructing variable photonic coupler 200 in a semiconductor process. In an example, substrate 210 is an electro-optical material such as Lithium Niobate (LiNbO$_3$). First waveguide 120 and second waveguide 122 are diffused into substrate 210. In an example, a preferred method of manufacture diffuses titanium into substrate 210 comprised of Lithium Niobate (LiNbO₃) to create waveguides 120, 122. First region 10, coupling region 112, and second region 114 remain as regions of substrate 210 that were not subject to diffusion.

A first electrode 220 and a second electrode 222 are deposited and patterned to provide a field across coupling region 112, first waveguide 120, and second waveguide 122. Electrodes 220, 222, in a preferred example where substrate 210 is Lithium Niobate, are chrome/gold and are patterned directly adjacent to first waveguide 120 and second waveguide 122. Electrodes 220, 222 may also comprise titanium, titanium/gold, chrome/silver, chrome, copper, and aluminum, depending upon material choice for substrate 210.

A field is generated by a potential difference (i.e., voltage) between first electrode 220 and second electrode 222. The field is provided substantially through coupling region 112, first waveguide 120, and second waveguide 122 so as to modify the refractive index of the electro-optical materials. Upper dielectric 212 is provided to cap variable photonic coupler 200 and is preferably silicon dioxide, Upper dielectric 212 may also function to reduce propagation loss coupling region 112, first waveguide 120, and second waveguide 122. Moreover, where further propagation loss is desired, the entirety of variable photonic coupler 200 may be covered by dielectric material, except for optical input 160, first optical output 162, and second waveguide 164.

When a mode field from first waveguide 120 overlaps second waveguide 122, evanescent wave coupling between waveguides 120, 122 occurs. The evanescent wave coupling gradually transfers the optical power from first waveguide 120 to second waveguide 122. If waveguides 120, 122 and coupling region 112 are long enough, the coupling process occurs continuously until all light in first waveguide 120 is transferred to second waveguide 122. Further, the field generated by first electrode 220 and second electrode 222 provides a modification to the refractive index of waveguides 120, 122 and coupling region 112 to provide for the coupling to occur. If waveguides 120, 122 and coupling region 112 are overly long in adjacent length, after optical power is entirely coupled from first waveguide 120 to second waveguide 122, optical coupling will further continue to transfer optical power back to first waveguide 120.

Figure 2C:
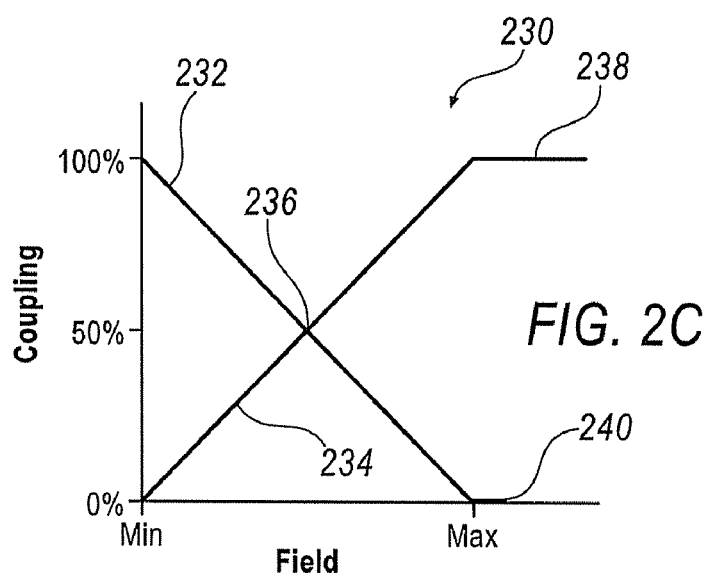
FIG. 2C illustrates a coupling graph showing optical coupling between the first and second waveguide of the variable photonic coupler of FIG. 2A when a field is applied.

FIG. 2C illustrates a coupling graph 230 showing optical coupling between the first waveguide 120 and second waveguide 122 when a field is applied to variable photonic coupler 200. Coupling graph 230 shows a first coupling 232 as the coupling from optical input path 130 (shown in FIG. 1A) to first output 134, Additionally, coupling graph 230 shows a second coupling 234 as the coupling from optical input path 130 (shown in FIG. 1A) to second output 142. The field strength of waveguides 120, 122 and coupling region 112 should be chosen to allow complete coupling of optical power to either first waveguide 120 or second waveguide 122. Moreover, the length of waveguides 120, 122 should also be chosen carefully based on the application.

As discussed above, the field that manipulates the refractive index of coupling region 112, first waveguide 120, and second waveguide 122 is generated by a potential difference between electrodes 220, 222 (shown in FIG. 21B). When the applied field is zero (0), there is substantially no coupling between first waveguide 120 and second waveguide 122. Thus, the first coupling 232 is substantially one hundred percent (100%) and substantially the entire signal at optical input path 130 (shown in FIG. 1 A) is coupled to first output 134 and substantially no signal is coupled to second output 142.

As further illustrated in FIG. 2C, when the applied field is set to a predetermined equilibrium strength, first coupling 232 and second coupling 234 will equalize at fifty percent (50%) (shown in coupling graph 230 at 236), which indicates that the signal at optical input path 130 (shown in FIG. 1A) is distributed evenly between first output 134 and second output 142. When the applied field is at a maximum, substantially all of the signal at optical input path 130 (shown in FIG. 1A) is coupled to second output 142 (shown in coupling graph 230 at 238) and none of the signal is coupled to first output 134 (shown in coupling graph 230 at 240). Thus, by varying the field generated by electrodes 220, 222, the amount of coupling between first output 134 and second output 142 is selectively variable. In this way, variable photonic coupler 200 may be used as a switch or as a splitter to variably distribute the signal at optical input path 130 to first output 134 and second output 142.

To use variable photonic coupler 200 as a switch, for example, a circuit may control the field to a minimum level (e.g., no field) to allow one hundred percent (100%) coupling of optical input path 130 to first output 134. When switching of optical input path 130 to second output 142 is desired, the circuit controls the field to a maximum level (see FIG. 2C) where second output 142 is at one hundred percent (100%) (shown in coupling graph 230 at 238) and first output 134 is at zero percent (0%) (shown in coupling graph 230 at 240). As shown in FIG. 2C, the sum of first coupling 232 and second coupling 234 is one hundred percent (100%) along any variability of the field, Thus, in examples where a variable coupling is desired, (e.g., a coupling that is not simply switched between a maximum and minimum coupling) variable photonic coupler 200 is used to couple a portion of optical input path 130 to either first output 134, and/or second output 142. That is to say, if all of optical input path 130 is coupled to first output 134 then there is no coupling of optical input path 130 with second output 142. Similarly, where all of optical input path 130 is coupled to second output 142 then there is no coupling of optical input path 130 with first output 134.

When any portion, other than a complete coupling, of optical input path 130 is coupled with either of first output 134 or second output 142, variable photonic coupler 200 performed similarly to a passive splitter. However, the amount of coupling of variable photonic coupler 200 is controllable by the field applied using electrodes 220, 222 (shown in FIG. 2B). Thus, by controlling the field, variable photonic coupler 200 performs as an adjustable splitter and may be adjusted while in use without having to replace a component. Indeed, variable photonic coupler 200 may be modulated in-service and used to control the amount of optical power that is transferred from optical input path 130 to first output 134 or second output 142.

The refractive index change of waveguides 120, 122 and coupling region 112 is proportional to the electric field strength applied using electrodes 220, 222. However, the relationship of field strength to refractive index is dependent upon materials, as is known to those skilled in the art, Thus, the field shown in FIG. 2C must be adjusted based on the particular electro-optical material chosen to construct variable photonic coupler 200. Moreover, the field strength is dependent upon the placement, size, and orientation of electrodes 220, 222 relative to the electro-optical material.

By changing the field strength, the refractive index of the electro-optical material is also changed. In an example where no field is applied, optical input path 130 is completely coupled with first output 134 due to complete internal reflection through first waveguide 120. However, when a maximum field is applied, the difference in refractive index between first waveguide 120 and second waveguide 122 is such that all of the optical power from optical input path 130 is coupled from first waveguide 120 to second waveguide 122 and second output 142.

Because the field is controllable using a variable and adjustable potential difference between 220, 222 (shown in FIG. 2B), the refractive index may be controlled to all values between complete internal reflection through first waveguide 120 and complete coupling of first waveguide 120 with second waveguide 122. In this way, the controllability of the field allows for any variation of coupling between first waveguide 120 and second waveguide 122 to achieve a switching effect or a splitting effect of first output 134 and second output 142. By adjusting the refractive indexes of waveguides 120, 122, the behavior and operation of variable photonic coupler 200 is controllable. Examples of uses of variable photonic coupler 200 in optical systems are described below where variable photonic coupler 200 is used as a switch and/or splitter while in operation. Moreover, variable photonic coupler 200 may be controlled to operate in either mode when in-service by controlling the field.

Figure 3:
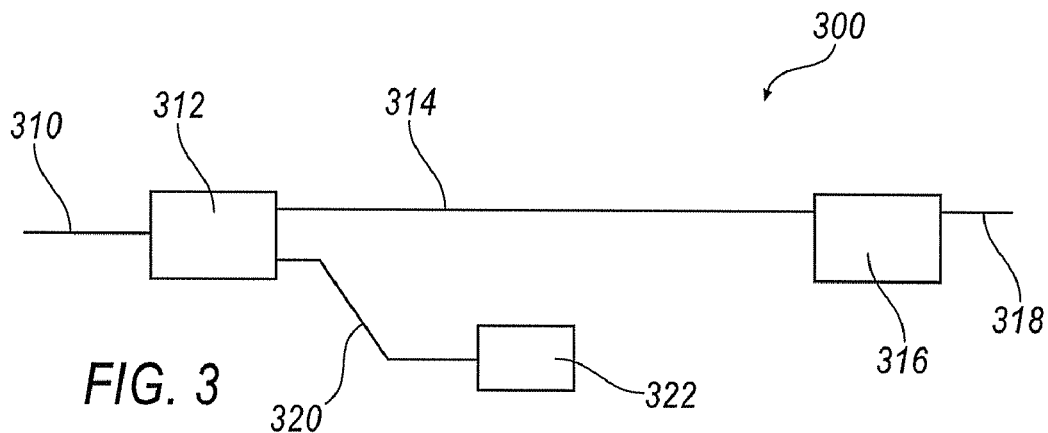
FIG. 3 is an optical monitoring system using the variable photonic coupler of FIG. 1.

FIG. 3 is an optical monitoring system 300 using the variable photonic coupler of FIG. 1. An optical input 310 provides a signal from a fiber-optic communications system to a variable photonic coupler 312. A first transmission path 314 is connected to a first output of variable photonic coupler 312 and carries the signal to a receiving device 316 that then further propagates the signal at an output 318 in an optical or electrical manner. A monitoring path 320 is connected to a second output of variable photonic coupler 312 and carries the signal to an optical monitor 322. Optical monitor 322 may be used for in-service monitoring of optical input 310, as well as the equipment, fiber, or other services used to provide optical input 310.

As shown in the configuration of FIG. 3, variable photonic coupler 312 behaves as a tap such that a predetermined amount of light (e.g., five percent to ten percent (5%-10%)) may be coupled to monitoring path 320 and optical monitor 322. This method of monitoring allows for a minimum of power to be diverted from entering first transmission path 314. If an error is detected or suspected in the system, more power may be coupled to the optical monitor 322, while first transmission path 314 remains in-service, to enable a more detailed measurements and analysis. That is to say, if a problem is suspected, more power may be transferred on a temporary basis to perform more detailed testing or inspection of the signal. Because the transmission of variable photonic coupler 312 may be electrically modified, such increased coupling to monitoring path 320, testing may be triggered remotely and/or automatically. Moreover, when testing and/or diagnosis are complete, the additional power required for detailed testing may be switched back to first transmission path 314. Such a configuration allows for monitoring without a typical loss (e.g., three decibel (3 dB)) associated with a passive component optical splitter that is permanently in the system.

Figure 4:
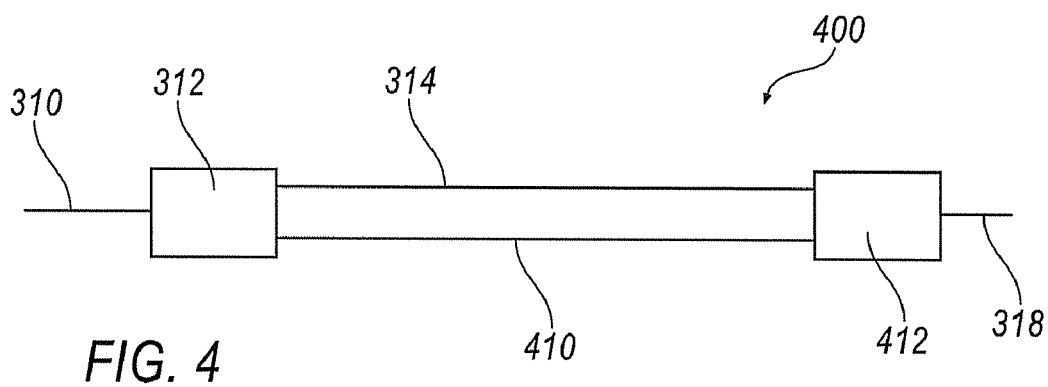
FIG. 4 is a redundant optical transmission system using the variable photonic coupler of FIG. 1.

FIG. 4 is a redundant optical transmission system 400 using the variable photonic coupler of FIGS. 1 and 2A-2C. Variable photonic coupler 312 receives optical input 310 and determines what portion of optical input 310 to present to first transmission path 314 and a second transmission path 410. An optical receiver 412, in an example where variable photonic coupler 312 is used as an optical switch, receives both first transmission path 314 and second transmission path 410 and decides which signal to present to output 318. If, for example, a problem were to occur with first transmission path 314, a control signal (not shown) may command variable photonic coupler 312 to couple all of optical input 310 to second transmission path 410. The same control signal may at the same time command optical receiver 412 to switch second transmission path 410 to output 318. If a problem were to occur with second transmission path 410, the control signal may command variable photonic coupler 312 to couple all of optical input 310 to first transmission path 314 and, at the same time, command optical receiver 412 to switch first transmission path 314 to output 318. In this way, when a problem is detected with either of first transmission path 314 or second transmission path 410, a control signal may switch the path of optical input 310 to output 318. Such switching is also useful in an "optical 1:1" and/or "optical 1:1" configuration. Using variable photonic coupler 312, light may be selectively split between working and protection fabrics without the normal insertion loss associated with a fixed passive splitter.

In another example, variable photonic coupler 312 may also be used to adjust the attenuation of the optical signal through to remove path dependent loss variations. For example, if there is a transmission loss difference between first transmission path 314 and second transmission path 410, variable photonic coupler 312 may be used to selectively balance the optical power between first transmission path 314 and second transmission path 410 such that the same optical power is presented to optical receiver 412 for each of first transmission path 314 and second transmission path 410, Further, by determining the coupling necessary to provide balanced optical power to optical receiver 412, a determination may be made as to the efficiency of a fiber, possible damage, splice loss, or connector loss.

In accordance with another example, optical receiver 412 may be embodied as a passive optical combiner such that any optical signal present on either of first transmission path 314 and second transmission path 410 will be combined to output 318. Using a passive optical combiner, and using variable photonic coupler 312 as a switch (e.g., all power is switched to only one of first transmission path 314 and second transmission path 410), no switching at optical receiver 412 is necessary. Thus, reliability is increased because optical receiver 412 is not an active component, but rather is a passive component.

Figure 5:
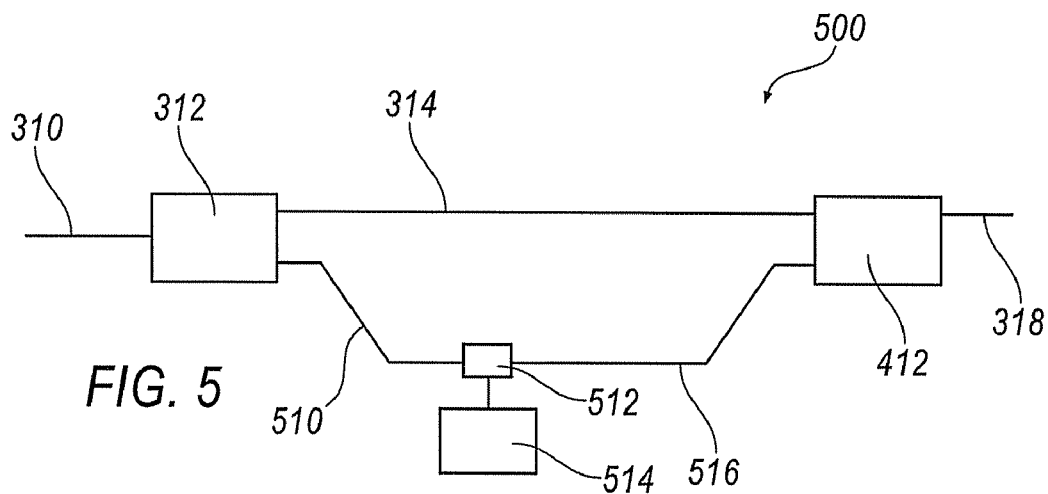
FIG. 5 is a redundant optical transmission system using the variable photonic coupler of FIG. 1A and including a monitor.

FIG. 5 is a redundant optical transmission system 500 using variable photonic coupler 312 and including an optical monitor 514. Variable photonic coupler 312 includes a bypass path 510 to an optical splitter 512. Optical splitter 512 is a passive component that splits a predetermined percentage of optical power, in this configuration, to optical monitor 514 and optical receiver 412 via a path 516. In contrast to redundant optical transmission system 400 of FIG. 4, transmission system 500 includes hardware to monitor the optical signal from variable photonic coupler 312.

In operation, first transmission path 314 is used as the primary optical path for optical input 310. However, a percentage (e.g., five percent (5%) to ten percent (10%)) of optical power is coupled to bypass path 510 by variable photonic coupler 312. The optical power is sent to optical monitor 514 via optical splitter 512 for in-service monitoring. If a problem is found with first transmission path 314, then the majority or the entirety of optical power from optical input 310 is coupled to bypass path 510 at variable photonic coupler 312 Thus, the optical path comprising bypass path 510 and path 516 is used as a backup optical path while only a minor portion is diverted to optical monitor 514 via optical splitter 512.

With regard to both FIGS. 4 and 5, the elements of each figure may be used within a large fabric of optical networking. For example, first transmission path 314 may represent a primary fabric of an optical network while second transmission path 410 (or bypass path 510 and path 516) may represent a secondary or backup optical fabric. Thus, variable photonic coupler 312 may be used to switch between a primary and secondary fabric of a redundant optical network. Moreover, variable photonic coupler 312 may be used to switch between fabrics or fibers in an "optical 1+1" and/or "optical 1:1" configuration. Moreover, the variability of the percentage of power further allows for in-service monitoring of a fiber connected to a variable photonic coupler 312 without interruption of service.

The present invention has been particularly shown and described with reference to the foregoing examples, which are merely illustrative of the best modes for carrying out the invention. It should be understood by those skilled in the art that various alternatives to the examples of the invention described herein may be employed in practicing the invention without departing from the spirit and scope of the invention as defined in the following claims. The examples should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

With regard to the processes, methods, heuristics, etc. described herein, it should be understood that although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes described herein are provided for illustrating certain examples and should in no way be construed to limit the claimed invention.

Accordingly, it is to be understood that the above description is intended to be illustrative and not restrictive. Many alternative approaches or applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

The invention claimed is:

1. A system, comprising:
a first waveguide having an optical input and a first optical output;
a second waveguide having a second optical output;
a coupling region between said first waveguide and said second waveguide, said coupling region controllably coupling said first waveguide and said second waveguide when a field is applied to said coupling region, wherein the strength of said field is variable to control said coupling;
an optical monitor connected to one of said first optical output and said second optical output, said optical monitor measuring a signal quality of a signal from said optical output, wherein an amount of coupling is selectively controlled based on the measured signal quality;
a primary optical fabric connected to said first optical output;
a secondary optical fabric connected to said second optical output; and
an optical splitter connected to said secondary optical fabric and configured to split a predetermined percentage of optical power to said optical monitor.

2. The system of claim 1, further comprising:
a first electrode; and
a second electrode, wherein said first and second electrode cooperate to provide said field when a voltage is applied thereupon, said field determining the amount of coupling between said first waveguide and said second waveguide.

3. The system of claim 1, further comprising:
an input fiber input optically engaging said first waveguide;
a first fiber output optically engaging said first waveguide;
a second fiber output optically engaging said second waveguide; and
wherein the strength of said field determines the optical power split from said first from said input fiber to said first output fiber and said second output fiber.

4. The system of claim 1, wherein said coupling is evanescent coupling.

5. The system of claim 1, wherein said first waveguide, said second waveguide, and said coupling region comprise an electro-optical material.

6. The system of claim 1, wherein said field is adjustable to provide a predetermined range of coupling of said first waveguide to said second waveguide.

7. The system of claim 6, wherein said predetermined range of coupling includes no coupling, partial coupling, and complete coupling.

8. The system of claim 1 wherein said a first said first waveguide and said second waveguide are formed of an electro-optical material and further comprising an electrode structure formed proximal to said first waveguide and said second waveguide, said electrode structure selectively providing said electric field in said electro-optical material when a voltage is applied in said electrode structure.

9. The system of claim 8, wherein said electric field controls said coupling of said first waveguide and second waveguide to controllably couple said optical input to either and/or both of said first optical output and said second optical output.

10. The system of claim 1, wherein the amount of coupling between said first waveguide and said second waveguide is controllable by predetermined strengths of said electric field.

11. The system of claim 1, wherein said first waveguide and said second waveguide are disposed in an electro-optical effect region.

12. The system of claim 11, wherein a field applied to said electro-optical effect region controls said coupling of said optical input to said first optical output and said second optical output.

13. The system of claim 12, wherein said field selectively controls said coupling of all of the power of said optical input to said second optical output.

14. The system of claim 12, wherein said field selectively controls said coupling at least a portion of the power of said optical input to said second optical output.

15. The system of claim 1,
wherein said variable coupling coupling region selectively couples the optical power from said optical input to said first optical output and said second optical output.

16. The system of claim 1, wherein said coupling region selectively couples the optical power from said optical input to said first optical output and said second optical output, said selective coupling balancing the optical power at the distal terminals of said first optical output and said second optical output.

* * * * *